Figure 1:
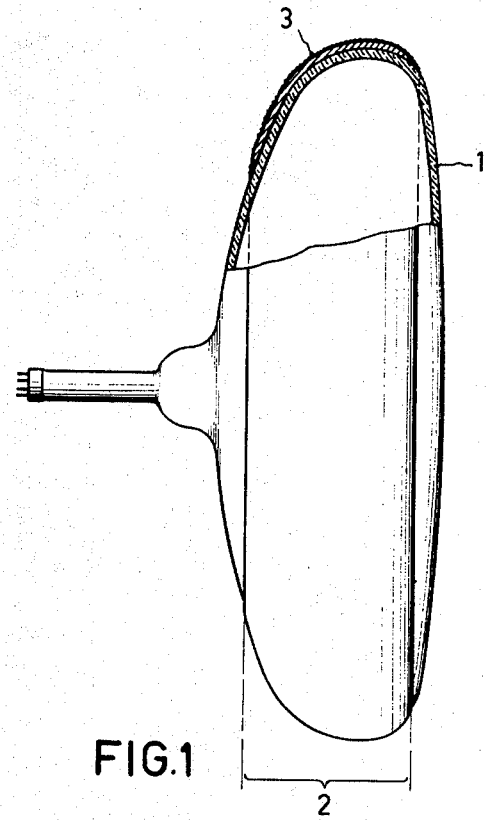

Dec. 7, 1965  J. CORNELISSEN ETAL  3,222,206
METHOD OF MANUFACTURING REINFORCED CATHODE-RAY
TUBE FOR TELEVISION DISPLAY
Filed Feb. 2, 1962

INVENTORS
JOHANNES CORNELISSEN
ANTON M. KRUITHOF
HENDRIK W.J.H. MEYER

BY
AGENT

United States Patent Office 3,222,206
Patented Dec. 7, 1965

3,222,206
METHOD OF MANUFACTURING REINFORCED CATHODE-RAY TUBE FOR TELEVISION DISPLAY
Johannes Cornelissen, Anton Maarten Kruithof, and Hendrik Willem Johan Hubertus Meyer, all of Emmasingel, Eindhoven, Netherlands, assignors to North American Philips Company, Inc., New York, N.Y., a corporation of Delaware
Filed Feb. 2, 1962, Ser. No. 170,638
Claims priority, application Netherlands, Feb. 24, 1961, 261,680
5 Claims. (Cl. 117—40)

This invention relates to methods of strengthening hollow glass objects, such as cathode-ray tubes for television display purposes, against mechanical injury, more particularly against bruising due to impact or shock.

It is known that glass objects manufactured by blowing or drawing may be considerably strengthened if the glass in the hot state, prior to shaping, is covered with a layer of a different glass having a thermal coefficient of expansion lower than that of the glass of the object. During cooling, the glass of the object contracts to a greater extent than does the glass layer provided which thus becomes subject to compressive stress. As an alternative, the outer layer of the glass of a finished glass object may be given a lower coefficient of expansion by chemical treatment with a molten salt so that the outer layer, after cooling, has likewise become subject to compressive stress.

It has been found that such glass surfaces under compressive stress, when damaged by scouring or scratches, do not show ageing phenomena.

However, it has been found that, although glass objects thus treated are much more resistant to mechanical injury such as scouring or scratches the non-resistance to bruising due to impact or shock forces has not increased to a sufficient extent.

According to the invention, more particularly the resistance to bruising is considerably increased by heating the hollow glass object and covering it with a thin layer of glaze obtained by spraying-deposition in the molten state (Schoop method), which glaze has a coefficient of expansion preferably lower than that of the glass of the wall of the object. This results in a somewhat porous glaze layer which may also be subject to compressive stress. Owing to the somewhat porous structure of the layer, impact or shock forces are not transferred directly to the glass wall but are absorbed in the layer.

Preferably a thin layer of a low-temperature melting glass, hereinafter referred to as glaze is preliminarily applied to the glass wall, which glaze has a coefficient of expansion lower than that of the glass of the object. The layer may be applied by spraying-deposition of pulverulent glaze and heating the object until the glaze melts so that the layer, after cooling, becomes subject to compressive stress and thus less sensitive to injury due to scouring or scratches. Greater resistance to such injury may be obtained by using glaze which readily crystallizes. The layer applied by spraying may have a thermal coefficient of expansion equal to, or different from, that of the glaze layer previously provided.

Figure 2:
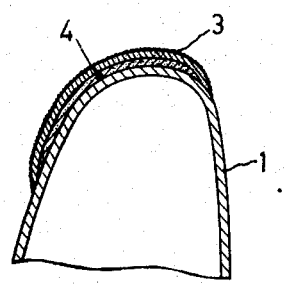

In order that the invention may be readily carried into effect, it will now be described in detail, by way of example, with reference to the accompanying diagrammatic drawing, in which:

FIGURE 1 is a sectional view of a cathode-ray tube according to the invention, and FIGURE 2 shows a detail of a further embodiment of a bulb manufactured in accordance with the invention.

FIGURE 1 shows the bulb 1 of a cathode-ray tube. A zone 2, in which dangerous tensile stresses are likely to occur in the glass, i.e. the surface portion of the cone adjoining the transparent viewing face, is covered with a porous glaze layer 3 by spraying-deposition of glaze in the liquid state. In FIGURE 2 the bulb 1 has preliminarily been covered with a glaze layer 4. The glaze of the layer 4 and, if desired, also that of the porous layer 3 have coefficients of expansion lower than that of the glass 1. The bulb 1 is maintained at a temperature of about 300° C. during the process of applying the layer 3.

The glass of the wall 1 may have the following composition:

70.3% by weight of $SiO_2$
0.5% by weight of $Li_2O$
7.8% by weight of $Na_2O$
7.5% by weight of $K_2O$
11.1% by weight of $BaO$
2.5% by weight of $Al_2O_3$
0.3% by weight of $Sb_2O_3$ The mean coefficient of expansion of this glass in the range from 30° C. to 300° C. is $95 \times 10^{-7}$.

The glaze of the layer 3 or 4 may consist of:

15% by weight of $SiO_2$
18% by weight of $B_2O_3$
8% by weight of $ZnO$
56% by weight of $PbO$
3% by weight of $Al_2O_3$ The mean coefficient of expansion of this glaze in the range from 30° to 300° C. is $65 \times 10^{-7}$.

However, it is alternatively possible to use other kinds of glaze. Thus, a readily crystallizing glaze may advantageously be used having the following composition:

22.7% by weight of $B_2O_3$
68.2% by weight of $ZnO$
9.1% by weight of $P_2O_5$

The mean thermal coefficient of expansion of such glaze in the range from 30° to 300° C. is $45 \times 10^{-7}$.

The layers 3 and 4 may consist of the same glaze, but it is also possible, in the case of FIGURE 2, to choose for the layer 3 a glaze different from that of the layer 4. The coefficient of expansion of layer 3 has become of minor importance in the presence of a layer 4 having a coefficient of expansion lower than that of the glass of the wall 1.

What is claimed is:

1. A method of strengthening a cathode-ray tube having a transparent window and a glass wall adjoining said window against bruising due to impact and shock forces comprising the steps, heating the cathode-ray tube to a temperature of about 300° C., covering a portion of the surface of the heated glass wall with a porous layer of glaze having a coefficient of expansion between about 30° C. and 300° C. which is lower than that of the glass to thereby place the layer under compression when it cools, and spraying over the first layer a second layer of a liquid glaze having a coefficient of expansion lower than that of the glass to form a porous, rough glaze layer covering said first glaze layer.

2. A method as claimed in claim 1 in which at least one layer is constituted of a glaze which readily crystallizes.

3. A method as claimed in claim 2 in which the glaze has the composition:

About 22.7% by weight of $B_2O_3$
About 68.2% by weight of $ZnO$
About 9.1% by weight of $P_2O_5$ 4. A method as claimed in claim 1 in which both glaze layers have the same composition.

5. A method as claimed in claim 4 in which the glaze has the composition:

>About 15% by weight of $SiO_2$
>About 18% by weight of $B_2O_3$
>About 8% by weight of ZnO
>About 56% by weight of PbO
>About 3% by weight of $Al_2O_3$

References Cited by the Examiner

UNITED STATES PATENTS

| | | | |
|---|---|---|---|
| 460,358 | 9/1891 | Buttler | 117—125 X |
| 1,613,758 | 1/1927 | Lindstrom | 117—94 |
| 1,708,743 | 4/1929 | Skaupy | 117—94 X |
| 2,030,397 | 2/1936 | Reynolds | 117—124 |
| 2,157,100 | 5/1939 | Rowland | 117—125 X |
| 2,327,972 | 8/1943 | Settinius | 117—125 X |
| 2,389,386 | 11/1945 | Russell | 117—125 |
| 2,428,357 | 10/1947 | Cohen et al. | 117—124 |
| 2,491,965 | 12/1949 | Gancy | 117—70 X |
| 2,668,783 | 2/1954 | Migley | 117—125 |
| 2,689,804 | 9/1954 | Sadowsky | 117—124 |
| 2,810,660 | 10/1957 | Carpenter | 117—70 X |
| 2,848,349 | 8/1958 | Rechter et al. | 117—124 |
| 2,889,952 | 6/1959 | Claypoole | 117—124 |
| 2,894,359 | 7/1959 | Pawlicki | 117—94 X |
| 2,904,449 | 9/1959 | Bradstreet | 117—105.2 |
| 3,024,303 | 3/1962 | Smothers et al. | 117—70 X |
| 3,055,762 | 9/1962 | Hoffman | 117—70 X |
| 3,063,198 | 11/1962 | Babcock | 117—124 |

FOREIGN PATENTS

| | | |
|---|---|---|
| 463,171 | 2/1950 | Canada. |
| 18,716 | 1910 | Great Britain. |
| 28,001 | 1912 | Great Britain. |

RICHARD D. NEVIUS, *Primary Examiner.*